US009304322B2

(12) United States Patent
Inoue et al.

(10) Patent No.: US 9,304,322 B2
(45) Date of Patent: Apr. 5, 2016

(54) PHASE DIFFERENCE ELEMENT AND DISPLAY UNIT

(75) Inventors: Junichi Inoue, Tochigi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 1060 days.

(21) Appl. No.: 13/168,008

(22) Filed: Jun. 24, 2011

(65) Prior Publication Data

US 2012/0002281 A1 Jan. 5, 2012

(30) Foreign Application Priority Data

Jun. 30, 2010 (JP) ................. P2010-149930

(51) Int. Cl.
*G02B 5/30* (2006.01)
*G02B 27/26* (2006.01)
*G02B 27/28* (2006.01)
*G02F 1/1335* (2006.01)
*G02B 5/32* (2006.01)
*G02F 1/13363* (2006.01)
*G02B 5/02* (2006.01)

(52) U.S. Cl.
CPC .............. *G02B 27/26* (2013.01); *G02B 5/0226* (2013.01); *G02B 5/0242* (2013.01); *G02B 5/0278* (2013.01); *G02B 5/3016* (2013.01); *G02B 5/3083* (2013.01); *G02B 5/32* (2013.01); *G02B 27/281* (2013.01); *G02B 27/286* (2013.01); *G02F 1/13363* (2013.01); *G02F 1/133502* (2013.01); *G02F 2413/09* (2013.01)

(58) Field of Classification Search
CPC ...... G02B 5/0278; G02B 5/3083; G02B 5/32; G02B 27/26; G02B 27/281; G02B 27/286; G02F 1/13363; G02F 1/133502

USPC .......... 359/464, 465, 486.02, 488.01, 489.07, 359/601; 349/117, 137

See application file for complete search history.

(56) References Cited

U.S. PATENT DOCUMENTS

| | | | | |
|---|---|---|---|---|
| 6,368,760 | B1 * | 4/2002 | Nishiguchi | 430/20 |
| 6,734,923 | B2 * | 5/2004 | Kwon et al. | 349/15 |
| 6,850,295 | B1 * | 2/2005 | Miyatake et al. | 349/112 |
| 6,917,400 | B2 * | 7/2005 | Nakamura et al. | 349/96 |
| 7,414,782 | B2 * | 8/2008 | Jung | 359/465 |
| 7,667,801 | B2 * | 2/2010 | Fukagawa et al. | 349/117 |
| 8,089,569 | B2 * | 1/2012 | Hoshi | 349/15 |

(Continued)

FOREIGN PATENT DOCUMENTS

| | | |
|---|---|---|
| CN | 101449183 | 6/2009 |
| JP | 2008-262165 | 10/2008 |
| WO | 2010/044414 | 4/2010 |

OTHER PUBLICATIONS

Chinese Office Action issued Jul. 31, 2014 in corresponding Chinese Application No. 201110171508.4.

*Primary Examiner* — Ricky D Shafer
(74) *Attorney, Agent, or Firm* — K&L Gates LLP

(57) ABSTRACT

A phase difference element capable of decreasing deterioration of 3D characteristics and a display unit including the phase difference element are provided. The phase difference element includes a phase difference film, and an anti-glare film. The phase difference film has a phase difference layer composed of two or more phase difference regions each having different direction of a slow axis that are regularly arranged in a plane. Retardation of the anti-glare film is 20 nm or less and total haze of the anti-glare film is 30% or less.

6 Claims, 11 Drawing Sheets

(56) References Cited

U.S. PATENT DOCUMENTS

| | | | |
|---|---|---|---|
| 8,223,280 B2 * | 7/2012 | Hoshi | 349/15 |
| 8,305,503 B1 * | 11/2012 | Hoshi | 349/15 |
| 8,547,489 B2 * | 10/2013 | Hsiao et al. | 349/15 |
| 2006/0232734 A1 * | 10/2006 | Schadt et al. | 349/117 |
| 2009/0195728 A1 | 8/2009 | Obata et al. | |
| 2011/0157698 A1 * | 6/2011 | Yoshimi | 359/462 |

* cited by examiner

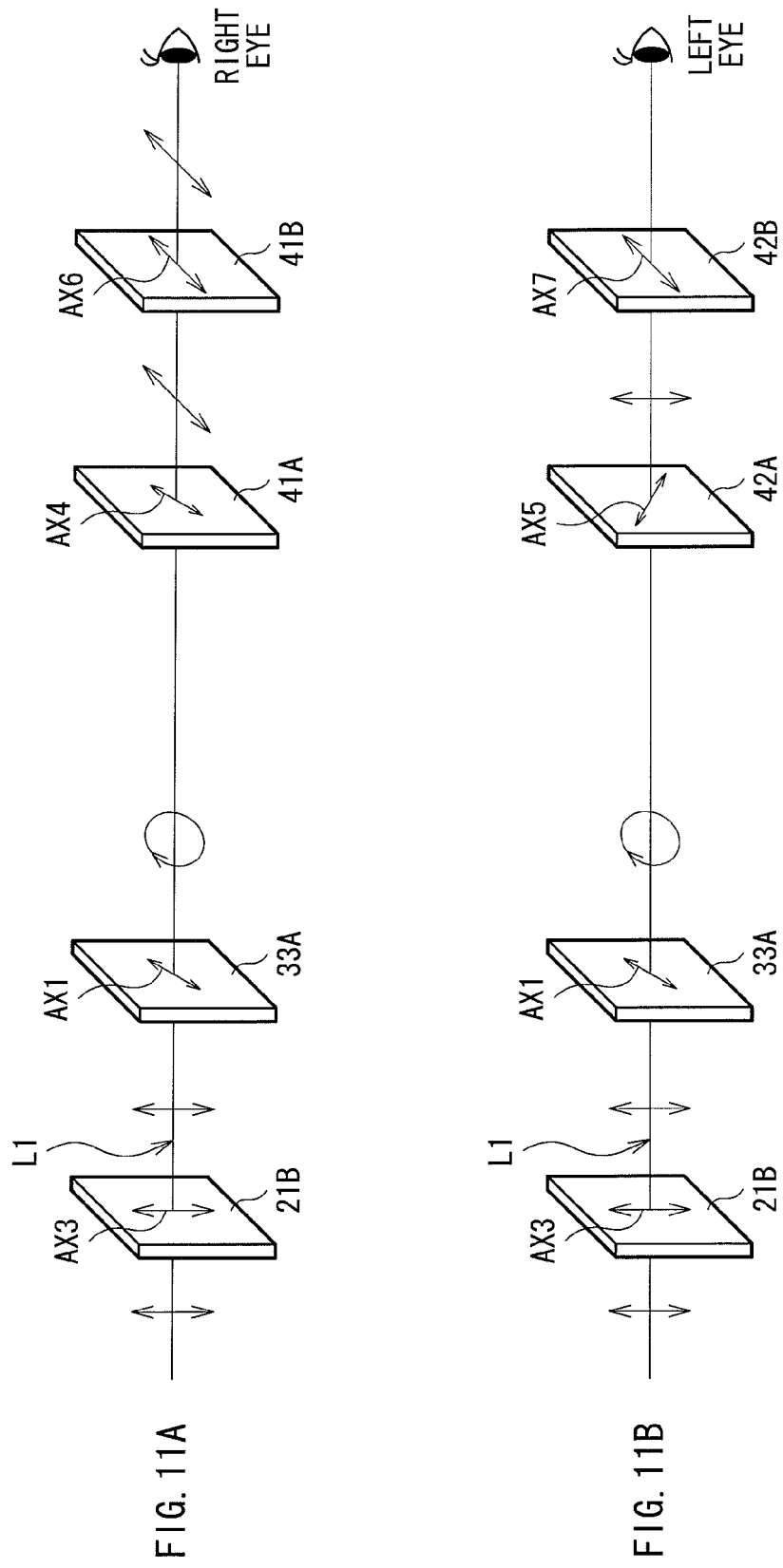

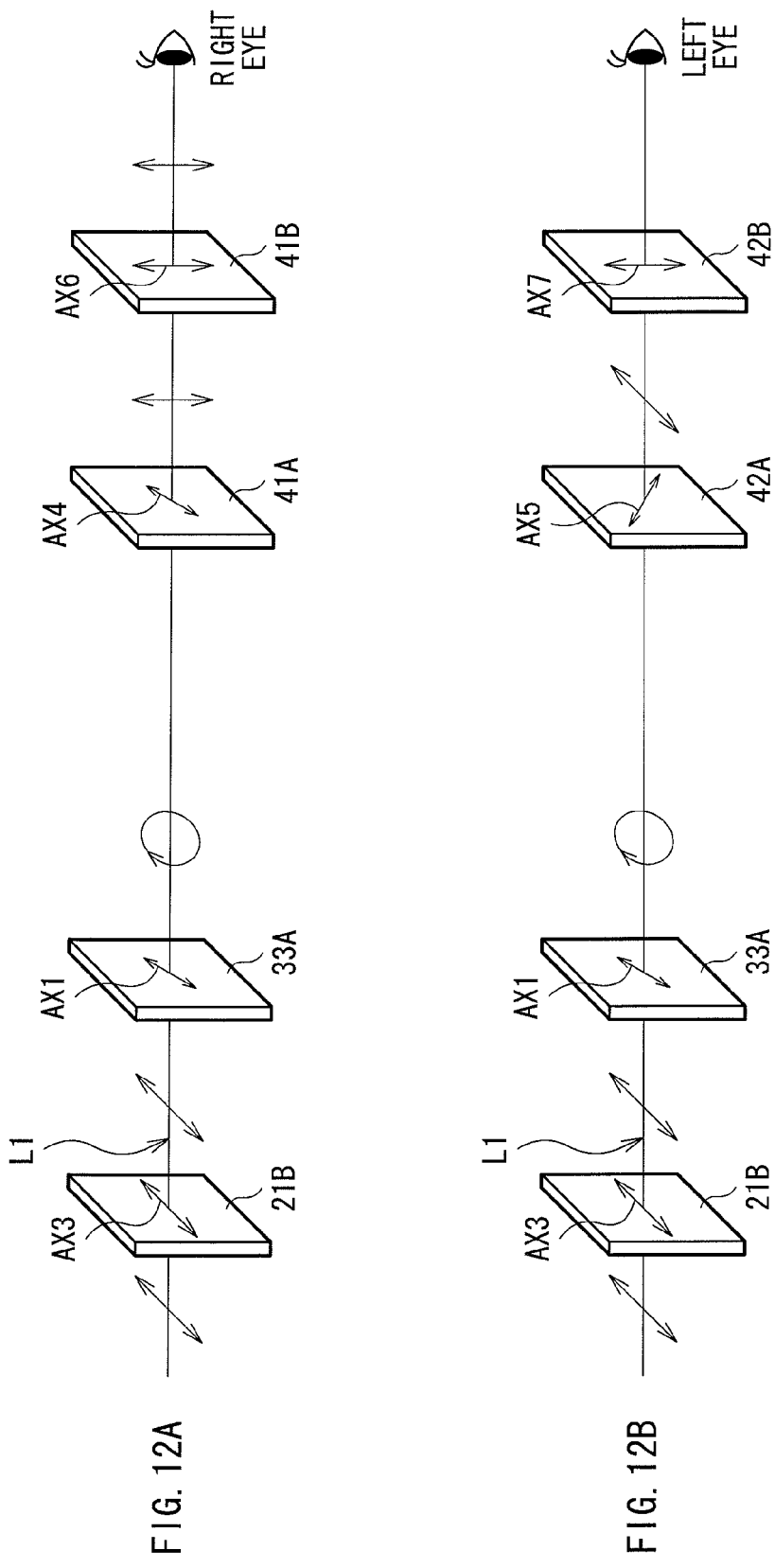

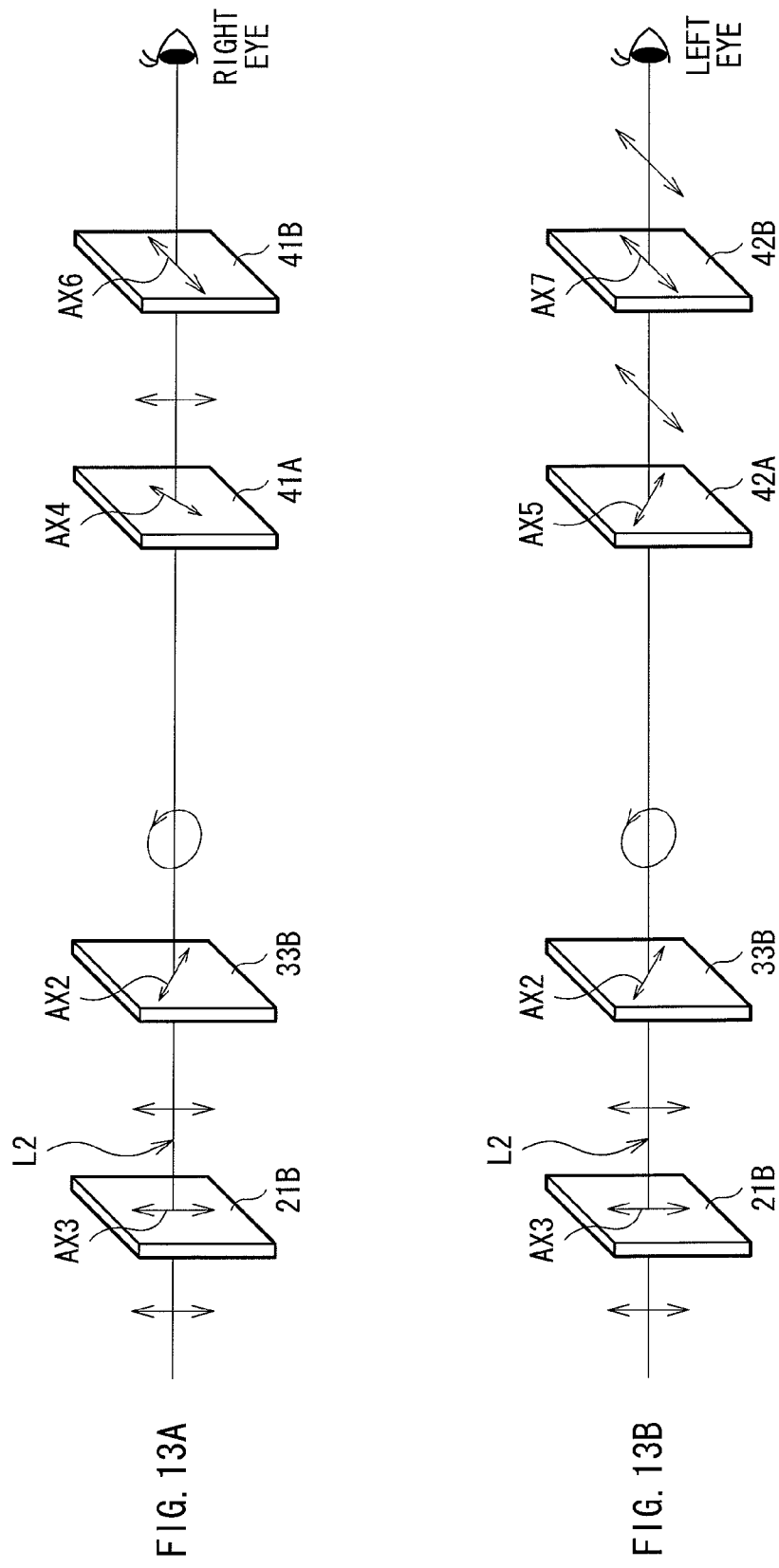

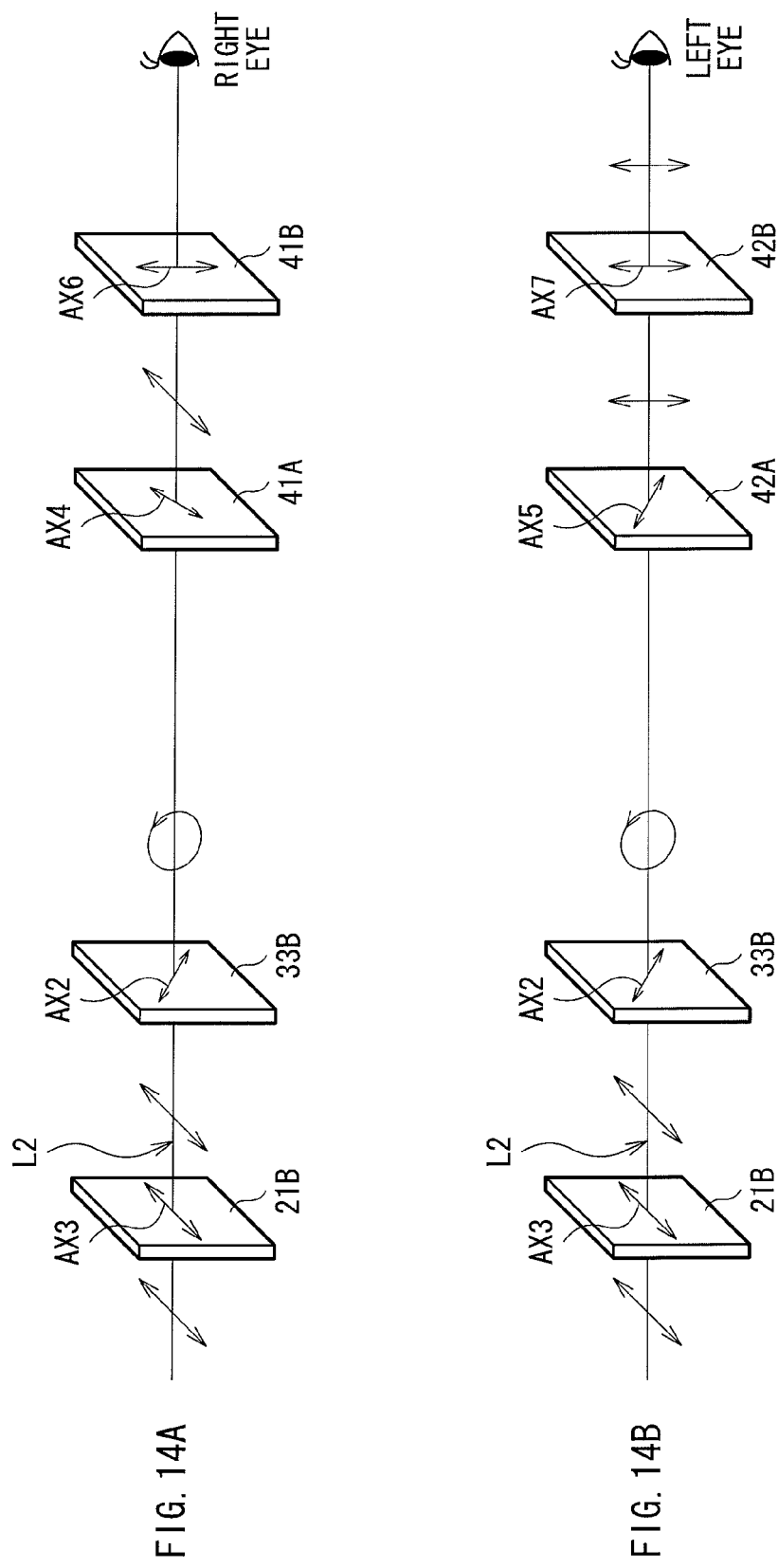

PHASE DIFFERENCE ELEMENT AND DISPLAY UNIT

CROSS REFERENCES TO RELATED APPLICATIONS

The present application claims priority to Japanese Priority Patent Application JP 2010-149930 filed in the Japan Patent Office on Jun. 30, 2010, the entire content of which is hereby incorporated by reference.

BACKGROUND

The present disclosure relates to a phase difference element provided with an anti-glare film and a display unit including such a phase difference element.

In various displays commencing with a liquid crystal display, it is general to use an anti-glare (AG) film that diffuses and reflects outside light on the screen front face for the display front face in order to decrease deterioration of visibility due to reflection of outside light such as sun light and indoor lighting. In the AG film, for example, a filler coating is formed on a base material film. The AG film is provided with anti-glare characteristics by forming the surface in a state of ground glass.

SUMMARY

However, the AG film has a disadvantage that image quality is easily deteriorated. For example, when image light is transmitted through the AG film, the light is distorted by refraction and diffusion by an anti-glare layer (for example, a filler coating) in the AG film, resulting in an unclear image. In particular, in the 3D displays capable of three dimensional display that have been commercially available one after another by various manufacturers since the beginning of this year, there is a disadvantage that the 3D characteristics (crosstalk) are significantly deteriorated if the AG film is arranged on the display front face.

In view of the foregoing disadvantages, in the present disclosure, it is desirable to firstly provide a phase difference element capable of decreasing deterioration of 3D characteristics. In the present disclosure, it is desirable to secondly provide a display unit including such a phase difference element.

According to an embodiment of the present disclosure, there is provided a phase difference element including a phase difference film and an anti-glare film. The phase difference film has a phase difference layer composed of two or more phase difference regions each having different direction of a slow axis that are regularly arranged in a plane. Meanwhile, retardation of the anti-glare film is 20 nm or less and total haze of the anti-glare film is 30% or less.

According to an embodiment of the present disclosure, there is provided a display unit including a display panel in which a plurality of pixels are arranged in a matrix state, and a phase difference element attached to the display panel. The phase difference element provided for the display unit includes a phase difference film arranged on the display panel side and an anti-glare film arranged on the side opposite to the display panel with respect to the phase difference film. The phase difference film has a phase difference layer composed of two or more phase difference regions each having different direction of a slow axis that are regularly arranged in a plane. Meanwhile, retardation of the anti-glare film is 20 nm or less and total haze of the anti-glare film is 30% or less.

In the phase difference element and the display unit of the embodiments of the present disclosure, the retardation of the anti-glare film is 20 nm or less and the total haze of the anti-glare film is 30% or less. Thereby, in the case where two types of phase difference regions are included in the phase difference film, one type of the phase difference regions generates right-eye image light, and the other type of the phase difference regions generates left-eye image light, when cross talk of the left-eye image light and crosstalk of the right-eye image light are defined by the following formulas 1 and 2, both the crosstalk of the left-eye image light and the crosstalk of the right-eye image light are kept 3.5% or less.

Crosstalk of left-eye image light=(luminance in the case where the left-eye image light is viewed through a right-eye optical device of polarized glasses)/(luminance in the case where the left-eye image light is viewed through a left-eye optical device of the polarized glasses)  Formula 1

Crosstalk of right-eye image light=(luminance in the case where the right-eye image light is viewed through the left-eye optical device of the polarized glasses)/(luminance in the case where the right-eye image light is viewed through the right-eye optical device of the polarized glasses)  Formula 2

In the phase difference element and the display unit of the embodiments of the present disclosure, the retardation of the anti-glare film may be 10 nm or less and the total haze of the anti-glare film may be 30% or less. In this case, both the crosstalk of the left-eye image light and the crosstalk of the right-eye image light are kept 2.5% or less.

According to the phase difference element and the display unit of the embodiments of the present disclosure, the retardation of the anti-glare film is 20 nm or less and the total haze of the anti-glare film is 30% or less. Thus, deterioration of 3D characteristics is able to be decreased. Further, in the case where the retardation of the anti-glare film is 10 nm or less and the total haze of the anti-glare film is 30% or less, deterioration of 3D characteristics is significantly able to be decreased.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIGS. 11A and 11B are conceptual views for explaining an example of a slow axis and a transmission axis in observing a picture of the display unit of FIG. 1 by the right eye.

FIGS. 12A and 12B are conceptual views for explaining another example of the slow axis and the transmission axis in observing the picture of the display unit of FIG. 1 by the right eye.

FIGS. 13A and 13B are conceptual views for explaining an example of the slow axis and the transmission axis in observing the picture of the display unit of FIG. 1 by the left eye.

FIGS. 14A and 14B are conceptual views for explaining another example of the slow axis and the transmission axis in observing the picture of the display unit of FIG. 1 by the left eye.

DETAILED DESCRIPTION

An embodiment of the present disclosure will be hereinafter described in detail with reference to the drawings. The description will be given in the following order.
1. Embodiment
1.1 Configuration of a display unit (FIG. 1 to FIG. 9)
1.2 Structure of polarized glasses (FIG. 10)
1.3 Basic operation (FIG. 11 to FIG. 14)
1.4 Effect
2. Modification 1. First Embodiment 1.1 Configuration of a Display Unit 1

Figure 1:
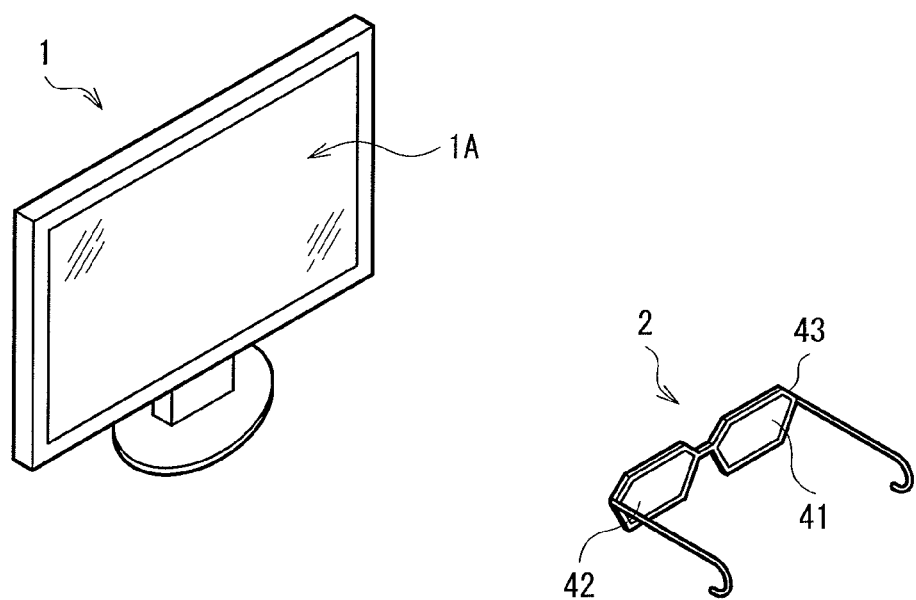
FIG. 1 is a perspective view illustrating an example of a configuration of a display unit according to an embodiment of the present disclosure together with polarized glasses.
Figure 2:
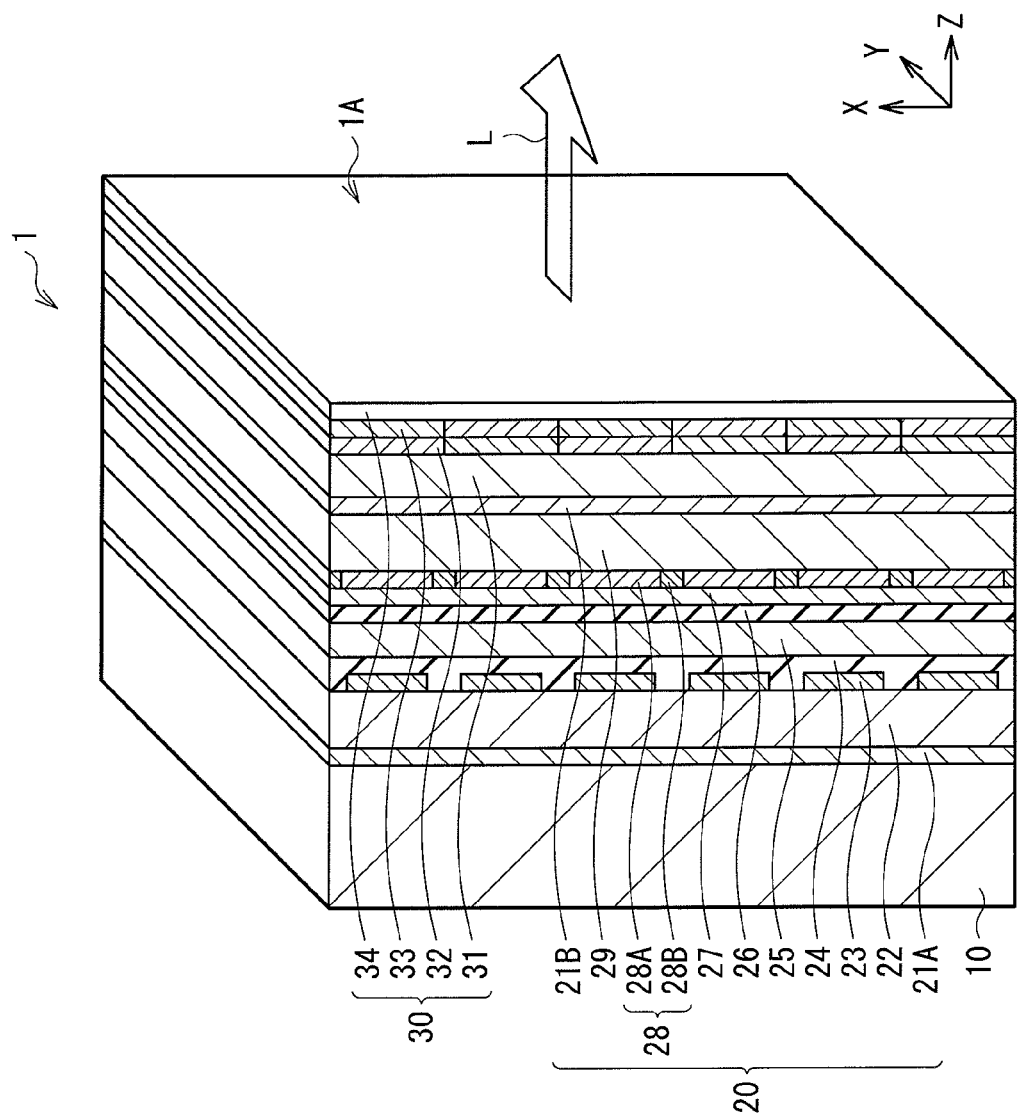
FIG. 2 is a cross sectional view illustrating an example of a configuration of the display unit of FIG. 1.

FIG. 1 perspectively illustrates a display unit 1 according to an embodiment of the present disclosure together with after-mentioned polarized glasses 2. FIG. 2 illustrates an example of a cross sectional configuration of the display unit 1 of FIG. 1. The display unit 1 is a polarized glasses type display unit that displays a stereoscopic image for an observer (not illustrated) wearing the polarized glasses 2 in front of eye balls. In the display unit 1, a backlight unit 10, a liquid crystal display panel 20 (display panel), and a phase difference element 30 are layered in this order. In the display unit 1, the front face of the phase difference element 30 is a picture display surface 1A, and is oriented to the observer side.

In this embodiment, the display unit 1 is arranged so that the picture display surface 1A is in parallel with the vertical plane. The picture display surface 1A is, for example, in the shape of a rectangle, and the longitudinal direction of the picture display surface 1A is, for example, in parallel with the horizontal direction (y-axis direction in the figure). The observer observes the picture display surface 1A by wearing the polarized glasses 2 in front of the eye balls. The polarized glasses 2 are circular polarized glasses. The display unit 1 is a display unit for circular polarized glasses.

(Backlight Unit 10)

The backlight unit 10 has, for example, a reflecting plate, a light source, and an optical sheet (not illustrated). The reflecting plate returns outputted light from the light source to the optical sheet side, and has functions such as reflection, scattering, and diffusion. The reflecting plate is made of, for example, foamed PET (polyethylene terephthalate) or the like. Thereby, outputted light from the light source is able to be used effectively. The light source illuminates the liquid crystal display panel 20 from behind. For example, in the light source, a plurality of linear light sources are arranged in parallel at even intervals, or a plurality of point light sources are two dimensionally arranged. Examples of the linear light source include a Hot Cathode Fluorescent Lamp (HCFL) and a Cold Cathode Fluorescent Lamp (CCFL). Examples of the point light sources include a Light Emitting Diode (LED). The optical sheet is intended to uniformize in-plane luminance distribution of light from the light source, or adjust a divergence angle and polarization state of light from the light source in a desired range. The optical sheet includes, for example, a diffusion plate, a diffusion sheet, a prism sheet, a reflective polarization device, a retarder and the like. Further, the light source may be edge light type. In this case, a light guide plate and a light guide film are used according to needs.

(Liquid Crystal Display Panel 20)

The liquid crystal display panel 20 is a transmissive display panel in which a plurality of pixels are two dimensionally arrayed in the row direction and in the column direction, and displays an image by driving each pixel according to a video signal. For example, as illustrated in FIG. 2, the liquid crystal display panel 20 has a light polarizer 21A, a transparent substrate 22, a pixel electrode 23, an alignment film 24, a liquid crystal layer 25, an alignment film 26, a common electrode 27, a color filter 28, a transparent electrode 29, and a light polarizer 21B sequentially from the backlight unit 10 side.

The light polarizer 21A is a polarization plate arranged on the light incident side of the liquid crystal display panel 20. The light polarizer 21B is a polarization plate arranged on the light output side of the liquid crystal display panel 20. The light polarizers 21A and 21B are a kind of optical shutter, and transmit only light in a specific oscillation direction (polarized light). The light polarizers 21A and 21B are respectively arranged so that, for example, each polarization axis is different from each other by a given angle (for example, 90 deg). Thereby, outputted light from the backlight unit 10 is transmitted through the liquid crystal layer or blocked. The shape of the polarization plate is not limited to a plate.

Direction of a transmission axis of the light polarizer 21A is set in a range in which light outputted from the backlight unit 10 is able to be transmitted. For example, in the case where a polarization axis of the light outputted from the backlight unit 10 is in the vertical direction, the transmission axis of the light polarizer 21A is also in the vertical direction. In the case where the polarization axis of the light outputted from the backlight unit 10 is in the horizontal direction, the transmission axis of the light polarizer 21A is also in the horizontal direction. The light outputted from the backlight unit 10 is not limited to linear polarized light, but may be circular polarized light, elliptic polarized light, or non-polarized light.

Direction of a polarization axis of the light polarizer 21B is set in a range in which light transmitted through the liquid crystal display panel 20 is able to be transmitted. For example, in the case where the polarization axis of the light polarizer 21A is in the horizontal direction, the polarization axis of the light polarizer 21B is in the direction orthogonal to the polarization axis of the light polarizer 21A (vertical direction). Further, for example, in the case where the polarization axis of the light polarizer 21A is in the vertical direction, the polarization axis of the light polarizer 21B is in the direction orthogonal to the polarization axis of the light polarizer 21A (horizontal direction). The foregoing polarization axis is synonymous with the foregoing transmission axis.

The transparent substrates 22 and 29 are generally a substrate transparent to visible light. In the transparent substrate on the backlight unit 10 side, for example, an active drive circuit including a TFT (Thin Film Transistor) as a drive device electrically connected to the pixel electrode 23, a wiring and the like is formed. The pixel electrode 23 is composed of, for example, Indium Tin Oxide (ITO), and functions as an electrode for every pixel. The alignment films 24 and 26 are made of, for example, a polymer material such as polyimide, and perform alignment treatment for liquid crystal. The liquid crystal layer 25 is composed of liquid crystal of, for example, Vertical Alignment (VA) mode, In-Plane Switching (IPS) mode, Twisted Nematic (TN) mode, or Super Twisted Nematic (STN) mode. The liquid crystal layer 25 has a function to transmit or block outputted light from the backlight unit 10 for every pixel according to an applied voltage from a drive circuit (not illustrated). The common electrode 27 is composed of, for example, ITO, and functions as an opposed electrode common to the respective pixel electrodes 23. In the color filter 28, a filter section 28A for providing outputted light from the backlight unit 10 with color separation into red (R), green (G), and blue (B) is arranged. In the color filter 28, a black matrix section 28B having a light shielding function is provided in a portion corresponding to an interface between pixels.

(Phase Difference Element 30)

Figure 3:
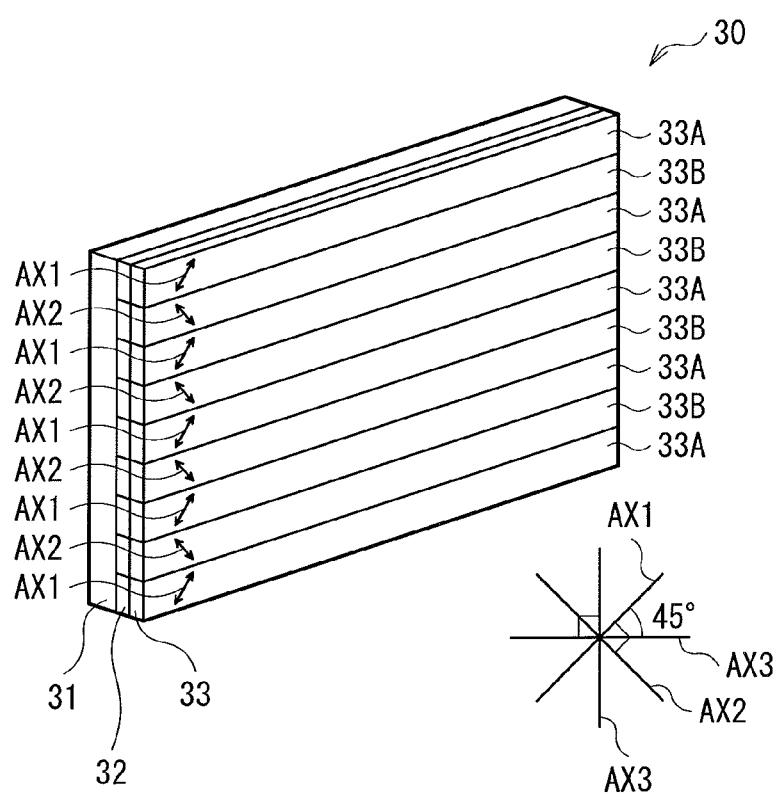
FIG. 3 is a perspective view illustrating an example of a structure of the phase difference element of FIG. 2.

Next, a description will be given of the phase difference element 30. FIG. 3 is a perspective view of an example of a structure of the phase difference element 30 except for an anti-glare film 34 described later. The phase difference element 30 changes polarization state of light transmitted through the light polarizer 21B of the liquid crystal display panel 20. The phase difference element 30 is attached to the surface on the light output side of the liquid crystal display panel 20 (light polarizer 21B) with the use of an adhesive (not illustrated) or the like. For example, as illustrated in FIG. 3, the phase difference element 30 has a base material 31, an alignment film 32, a phase difference layer 33, and the anti-glare film (AG film) 34 sequentially from the liquid crystal display panel 20 side. Though not illustrated, the base material 31, the alignment film 32, and the phase difference layer 33 may be arranged sequentially from the opposite side (observer side) of the liquid crystal display panel 20.

The base material 31 supports the alignment film 32, the phase difference layer 33, and the anti-glare film 34, and is made of, for example, a transparent resin film. As the transparent resin film, a film having small optical anisotropy, that is, a small birefringence is preferably used. Examples of such a transparent resin film having the foregoing characteristics include TAC (triacetyl cellulose), COP (cycloolefin polymer), COC (cycloolefin copolymer), and PMMA (polymethyl methacrylate). Examples of COP include Zeonor or Zeonex (registered trademark of Zeon Corporation) and Arton (registered trademark of JSR Corporation). The thickness of the base material film 31 is, for example, preferably from 30 μm to 500 μm both inclusive. Retardation of the base material film 31 is preferably 20 nm or less, and is more preferably 10 nm or less. The base material film 31 may be made of a glass substrate.

Figure 4A:
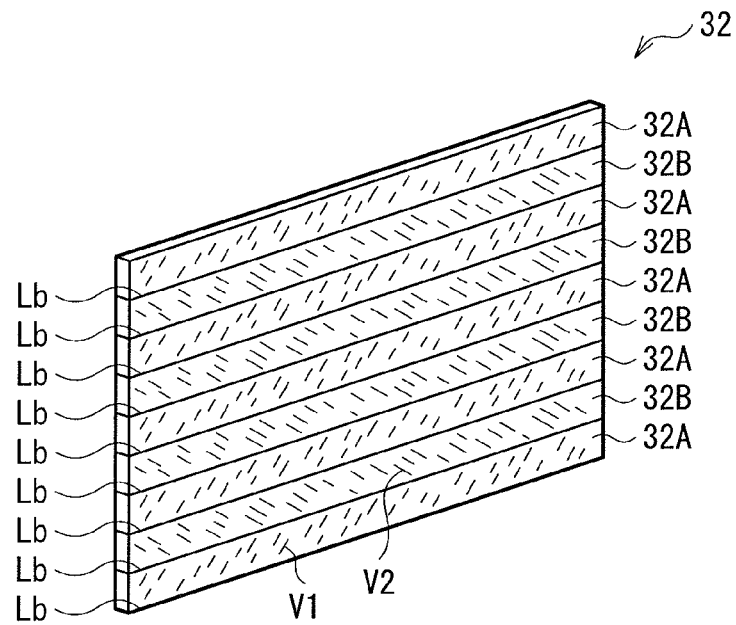
FIGS. 4A and 4B are perspective views illustrating an example of a structure of the alignment film of FIG. 3.

The alignment film 32 has a function for aligning an alignment material such as liquid crystal in a specific direction. The alignment film 32 is made of a transparent resin such as a UV curing resin and an electron beam curing resin or a thermoplastic transparent resin. The alignment film 32 is provided on the surface on the light output side of the base material 31. For example, as illustrated in FIG. 4A, the alignment film 32 has two types of alignment regions each having different alignment direction (a right-eye alignment region 32A and a left-eye alignment region 32B). The right-eye alignment region 32A and the left-eye alignment region 32B have, for example, a strip-shape extending in one common direction (horizontal direction). The right-eye alignment region 32A and the left-eye alignment region 32B are alternately arranged in the shorter direction (vertical direction) of the right-eye alignment region 32A and the left-eye alignment region 32B. The right-eye alignment region 32A and the left-eye alignment region 32B are arranged in accordance with the pixels of the liquid crystal display panel 20. For example, the right-eye alignment region 32A and the left-eye alignment region 32B are arranged at intervals corresponding to pixel intervals in the shorter direction (vertical direction) of the liquid crystal display panel 20.

Figure 4B:
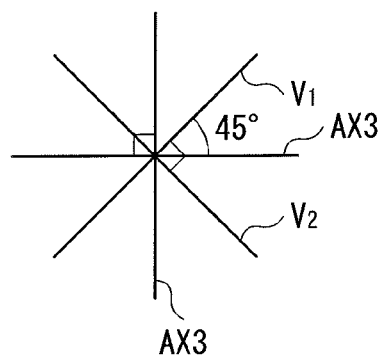

For example, as illustrated in FIGS. 4A and 4B, the right-eye alignment region 32A has a plurality of grooves V1 extending in the direction intersecting with a polarization axis AX3 of the light polarizer 21B at 45 deg. Meanwhile, as illustrated in FIGS. 4A and 4B, the left-eye alignment region 32B has a plurality of grooves V2 extending in the direction that intersects with the polarization axis AX3 of the light polarizer 21B at 45 deg and that is orthogonal to the extending direction of the groove V1. For example, as illustrated in FIGS. 4A and 4B, the grooves V1 and V2 extend in the diagonally 45 deg direction in the case where the polarization axis AX3 of the light polarizer 21B is in the vertical direction or in the horizontal direction. Further, though not illustrated, in the case where the polarization axis AX3 of the light polarizer 21B is in the diagonally 45 deg direction, the groove V1 extends, for example, in the horizontal direction, and the groove V2 extends, for example, in the vertical direction.

The respective grooves V1 may linearly extend in one direction, or may extend in one direction while swaying (meandering). The cross sectional shape of the respective grooves V1 is, for example, V-shape. Similarly, the cross sectional shape of the respective grooves V2 is, for example, V-shape. In other words, the cross sectional shape of the right-eye alignment region 32A and the left-eye alignment region 32B as a whole is saw-like. In the groove structure, intervals are preferably smaller, are several μm or less, and are more preferably several hundred nm or less. Such a shape is formed in block by, for example, transfer with the use of a pattern. Further, the alignment film 32 does not necessarily have the groove structure described above, but may be a light alignment film formed by polarized UV irradiation. The light alignment film is able to be formed by previously coating with a material that is to be aligned in the UV polarization direction when being irradiated with polarized UV, and irradiating UV light polarized in respectively different directions for the right-eye alignment region 32A and the left-eye alignment region 32B.

The phase difference layer 33 is a thin layer having optical anisotropy. The phase difference layer 33 is provided on, for example, the surface of the right-eye alignment region 32A and the left-eye alignment region 32B. For example, as illustrated in FIG. 3, the phase difference layer 33 has two types of phase difference regions (a right-eye phase difference region 33A and a left-eye phase difference region 33B) each having different direction of each slow axis.

For example, as illustrated in FIG. 3, the right-eye phase difference region 33A and the left-eye phase difference region 33B have a strip shape extending in one common direction (horizontal direction). The right-eye phase difference region 33A and the left-eye phase difference region 33B are arranged alternately in the shorter direction (vertical direction) of the right-eye phase difference region 33A and the left-eye phase difference region 33B.

For example, as illustrated in FIG. 3, the right-eye phase difference region 33A has a slow axis AX1 in the direction intersecting with the polarization axis AX3 of the light polarizer 21B at 45 deg. Meanwhile, for example, as illustrated in FIG. 3, the left-eye phase difference region 33B has a slow axis AX2 in the direction that intersects with the polarization axis AX3 of the light polarizer 21B at 45 deg and that is orthogonal to the slow axis AX1. For example, as illustrated in FIG. 3, the slow axes AX1 and AX2 are respectively in the diagonally 45 deg direction in the case where the polarization axis AX3 of the light polarizer 21B is in the vertical direction or in the horizontal direction. Further, though not illustrated, in the case where the polarization axis AX3 of the light polarizer 21B is in the diagonally 45 deg direction, the slow axis AX1 extends, for example, in the horizontal direction, and the slow axis AX2 is, for example, in the vertical direction. The slow axis AX1 is in the extending direction of the groove V1, and the slow axis AX2 is in the extending direction of the groove V2.

Figure 5A:
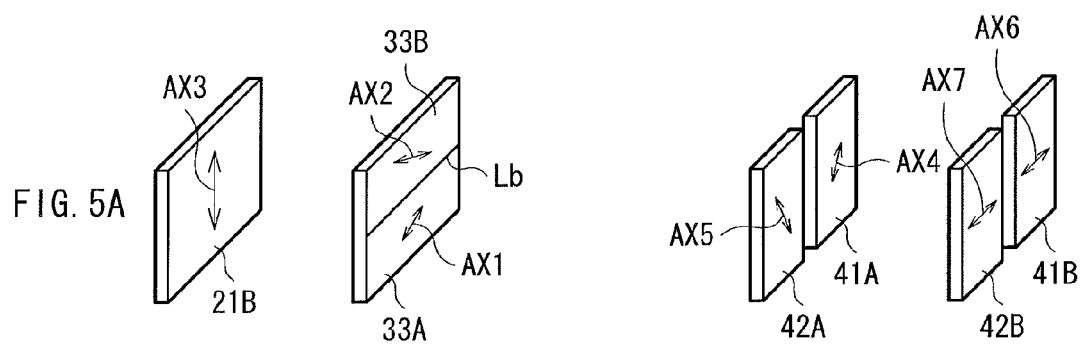
FIGS. 5A and 5B are conceptual views illustrating an example of slow axes of the right-eye phase difference region and the left-eye phase difference region of FIG. 3 together with a slow axis or a transmission axis of other optical member.
Figure 5B:
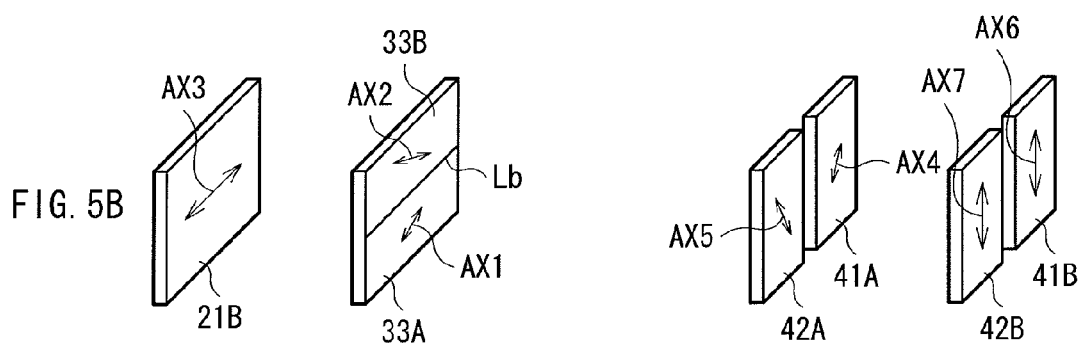

Further, for example, as illustrated in FIGS. 5A and 5B, the slow axis AX1 is in the same direction as that of a slow axis AX4 of a right-eye retarder 41A of the polarized glasses 2, and is in the direction different from that of a slow axis AX5 of a left-eye retarder 42A of the polarized glasses 2. Meanwhile, the slow axis AX2 is in the same direction as that of the slow axis AX5, and is in the direction different from that of the slow axis AX4.

The phase difference layer 33 contains, for example, a polymerized polymer liquid crystal material. That is, in the phase difference layer 33, alignment state of liquid crystal molecules is fixed. As the polymer liquid crystal material, a material selected according to the phase transition temperature (liquid crystal phase-isotropic phase), the refractive index wavelength dispersive characteristics of the liquid crystal material, the viscosity characteristics, the process temperature and the like is used. However, in terms of transparency, the polymer liquid crystal material preferably has an acryloyl group or a metaacryloyl group as a polymerized group. Further, as the polymer liquid crystal material, a material with no methylene spacer between a polymerizable functional group and a liquid crystal skeleton is preferably used, since thereby alignment treatment temperature at the time of process is able to be decreased. The thickness of the phase difference layer 33 is, for example, from 1 µm to 2 µm both inclusive. In the case where the phase difference layer 33 contains the polymerized polymer liquid crystal material, the phase difference layer 33 is not necessarily made of only the polymer liquid crystal material, and a non-polymerized liquid crystalline monomer may be contained therein as part thereof. The non-polymerized liquid crystalline monomer contained in the phase difference layer 33 is aligned in the direction similar to the alignment direction of liquid crystal molecules existing around the non-polymerized liquid crystalline monomer by alignment treatment (heat treatment) described later, and has alignment characteristics similar to alignment characteristics of the polymer liquid crystal material.

In the phase difference layer 33, long axes of the liquid crystal molecules are arrayed along the extending direction of the groove V1 in the vicinity of the interface between the groove V1 and the right-eye phase difference region 33A, and long axes of the liquid crystal molecules are arrayed along the extending direction of the groove V2 in the vicinity of the interface between the groove V2 and the left-eye phase difference region 33B. That is, according to the shape and the extending direction of the groove V1 and the groove V2, alignment of the liquid crystal molecules is controlled, and optical axes of the right-eye phase difference region 33A and the left-eye phase difference region 33B are set.

Further, in the phase difference layer 33, a retardation value of the right-eye phase difference region 33A and the left-eye phase difference region 33B is set by adjusting the component material and the thickness of the right-eye phase difference region 33A and the left-eye phase difference region 33B. In the case where the base material 31 has phase difference, the retardation value is preferably set considering the phase difference of the base material 31 as well. In this embodiment, the material and the thickness of the right-eye phase difference region 33A and the left-eye phase difference region 33B are identical with each other. Thereby, the absolute values of retardation thereof are identical with each other.

Figure 6:
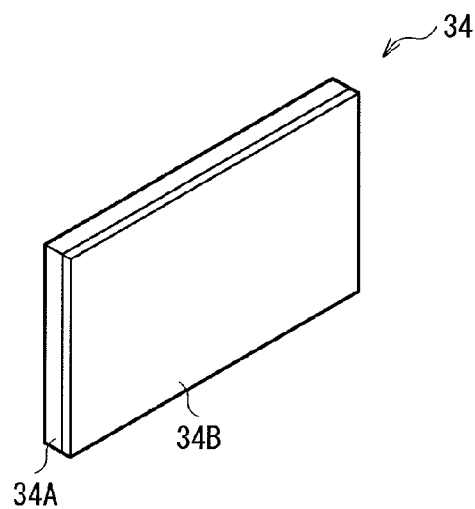
FIG. 6 is a perspective view illustrating an example of a structure of the anti-glare film of FIG. 3.

Next, a description will be given of the anti-glare film 34. The anti-glare film 34 diffuses and reflects outside light on the screen front face in order to decrease deterioration of visibility due to reflection of outside light such as sun light and indoor lighting. For example, as illustrated in FIG. 6, in the anti-glare film 34, a base material 34A and an anti-glare layer 34B are layered sequentially from the liquid crystal display panel 20 side.

Though not illustrated, the base material 34A and the anti-glare layer 34B may be layered sequentially from the opposite side of the liquid crystal display panel 20. Further, the structure of the anti-glare film 34 is not limited to the two layer structure as illustrated in FIG. 6. The structure of the anti-glare film 34 may be a structure in which, for example, the foregoing anti-glare layer 34B is omitted, and concavity and convexity (for example, emboss) is provided on the top face of the base material 34A. Further, the anti-glare film 34 may include a hard coating layer according to needs.

Figure 7:
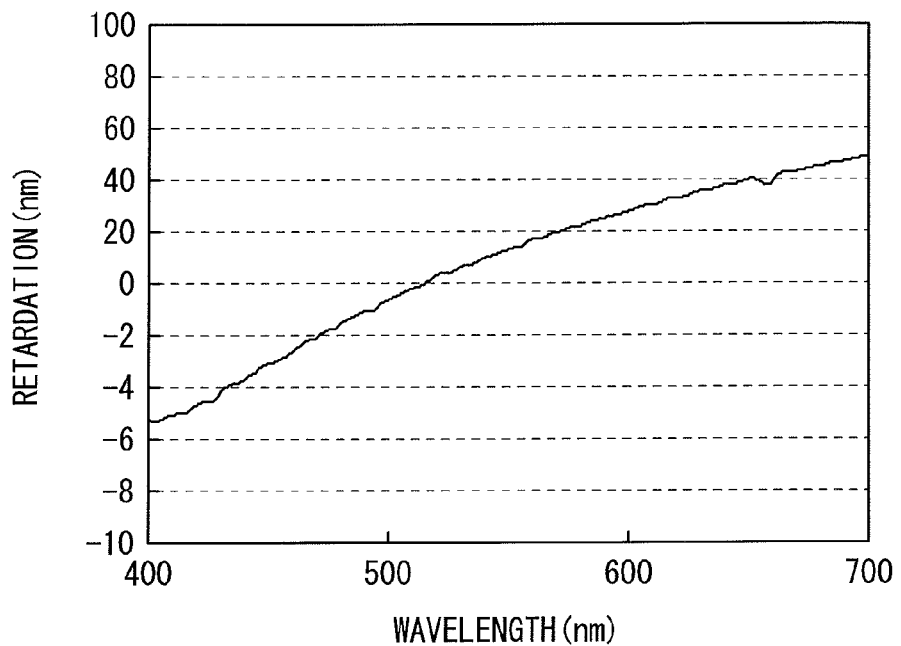
FIG. 7 is a diagram illustrating an example of actual measurement values of relation between retardation of the anti-glare film of FIG. 6 and wavelength.

As the base material 34A, for example, a material having small optical anisotropy, that is, a small birefringence is preferably used. Examples of such a transparent resin film having the foregoing characteristics include TAC (triacetyl cellulose), COP (cycloolefin polymer), COC (cycloolefin copolymer), and PMMA (polymethyl methacrylate). FIG. 7 illustrates actual measurement values of relation between retardation of the anti-glare film 34 in which the base material 34A is composed of TAC and wavelength. In FIG. 7, reversed symbol on the shortwave side means that a slow axis and a phase advance axis are reversed.

Retardation of the base material 34A is preferably 20 nm or less, and is more preferably 10 nm or less in green region range about from 500 nm to 560 nm both inclusive. The reason why the foregoing wavelength band is mentioned for the retardation value will be described later in detail. The base material 31 may be made of a glass substrate. In the case where the base material 31 is made of the glass substrate, retardation of the base material 31 is about zero (0) nm.

The anti-glare layer 34B is obtained by coating the surface of the base material 34A with a mixed solution in which a filler is dispersed in an energy curing resin binder, and giving energy such as heat and ultraviolet to the resultant and curing the resultant. On the top face of the anti-glare layer 34B, concavity and convexity is formed by, for example, a filler or the like. The top face of the anti-glare layer 34B is not necessarily in the shape of concavity and convexity.

Figure 8:
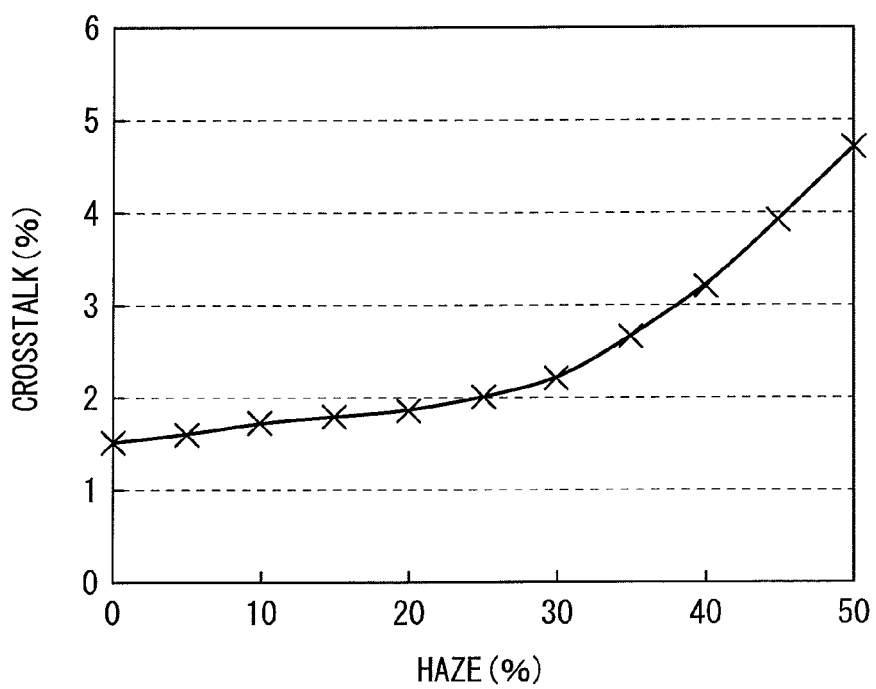
FIG. 8 is a diagram illustrating an example of actual measurement values of relation between crosstalk and haze of the anti-glare film of FIG. 6.

FIG. 8 illustrates actual measurement values of relation between crosstalk and haze of the anti-glare film 34 in which the base material 34A is composed of TAC. The haze in FIG. 8 is total haze measured according to the method of JIS K6782. Further, the crosstalk in FIG. 8 is a larger value either of crosstalk of left-eye image light or crosstalk of right-eye image light defined by the following formulas 1 and 2.

Crosstalk of left-eye image light=(luminance in the case where the left-eye image light is viewed through a right-eye optical device 41 of the polarized glasses 2)/(luminance in the case where the left-eye image light is viewed through a left-eye optical device 42 of the polarized glasses 2)   Formula 1

Crosstalk of right-eye image light=(luminance in the case where the right-eye image light is viewed through the left-eye optical device 42 of the polarized glasses 2)/(luminance in the case where the right-eye image light is viewed through the right-eye optical device 41 of the polarized glasses 2)   Formula 2

Figure 9:
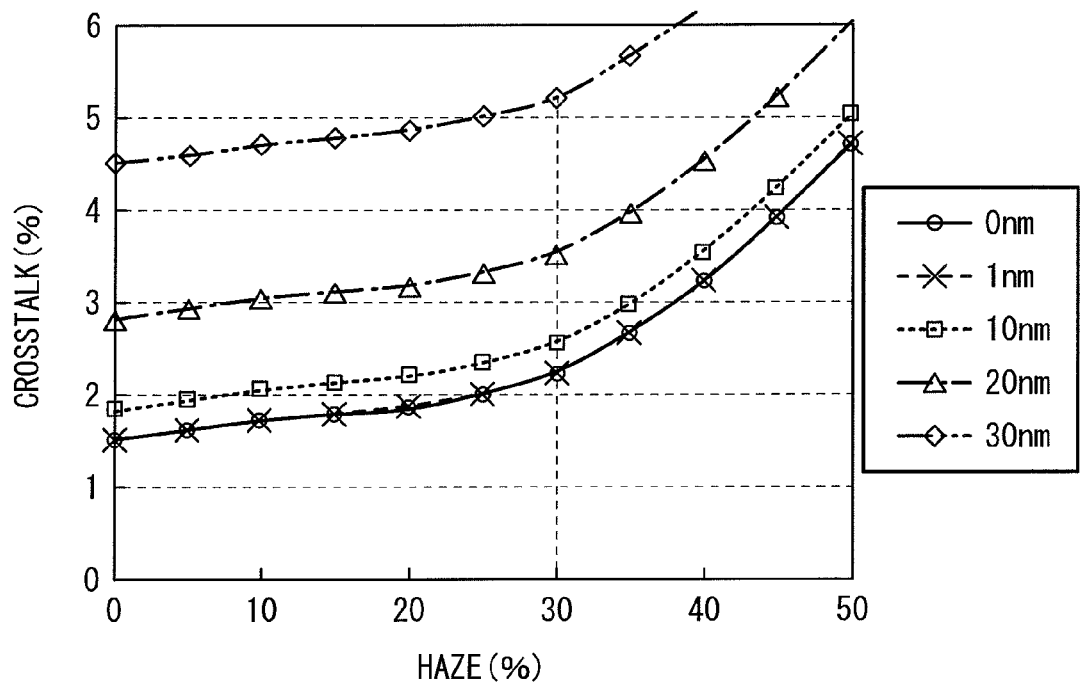
FIG. 9 is a diagram illustrating a relation between crosstalk and haze/retardation of the antiglare film with values derived by numerical value calculation with the use of the actual measurement values of FIG. 8.

FIG. 9 illustrates relation between the crosstalk and the haze retardation of the anti-glare film 34 that is derived by numerical value calculation with the use of the actual measurement values of FIG. 8. Each solid line in FIG. 9 illustrates a state that crosstalk is more moderately changed in the left side region from the point where each solid line intersects with the dashed line (region where the haze becomes 30% or less) compared to in the right side region from the point where each solid line intersects with the dashed line (region where the haze exceeds 30%).

The haze value is adjustable by changing the film thickness of the base material 34A or the anti-glare layer 34B or by changing the particle diameter or the refractive index of a filler in the case where the anti-glare layer 34B contains the filler. FIG. 8 and FIG. 9 illustrate values obtained by preparing many samples each having different film thickness of the anti-glare layer 34B (containing the filler) and measuring haze and crosstalk of each sample.

From FIG. 9, it is found that crosstalk is approximately constant in the case where the haze of the anti-glare film 34 is in the range from 0% to 30% both inclusive regardless of the retardation value of the anti-glare film 34. Accordingly, even if given crosstalk is determined as a specification of the display unit 1 in designing the anti-glare film 34, there is a range in which the retardation and the haze of the anti-glare film 34 are able to be freely combined without exceeding the specified crosstalk.

For example, in the case where the upper limit of a desired value as the crosstalk of the display unit 1 is 3.5%, the retardation of the anti-glare film 34 is adjustable in the range from 0 nm to 20 nm both inclusive, and the haze of the anti-glare film 34 is adjustable in the range from 0% to 30% both inclusive. Further, for example, in the case where the upper limit of a desired value as the crosstalk of the display unit 1 is 2.5%, the retardation of the anti-glare film 34 is adjustable in the range from 0 nm to 10 nm both inclusive, and the haze of the anti-glare film 34 is adjustable in the range from 0% to 30% both inclusive.

Thus, in the case where the retardation of the anti-glare film 34 is 20 nm or less and the total haze of the anti-glare film 34 is 30% or less, the crosstalk of the display unit 1 is able to be kept 3.5% or less. Further, in the case where the retardation of the anti-glare film 34 is 10 nm or less and the total haze of the anti-glare film 34 is 30% or less, the crosstalk of the display unit 1 is able to be kept 2.5% or less.

1.2 Polarized Glasses 2

Figure 10:
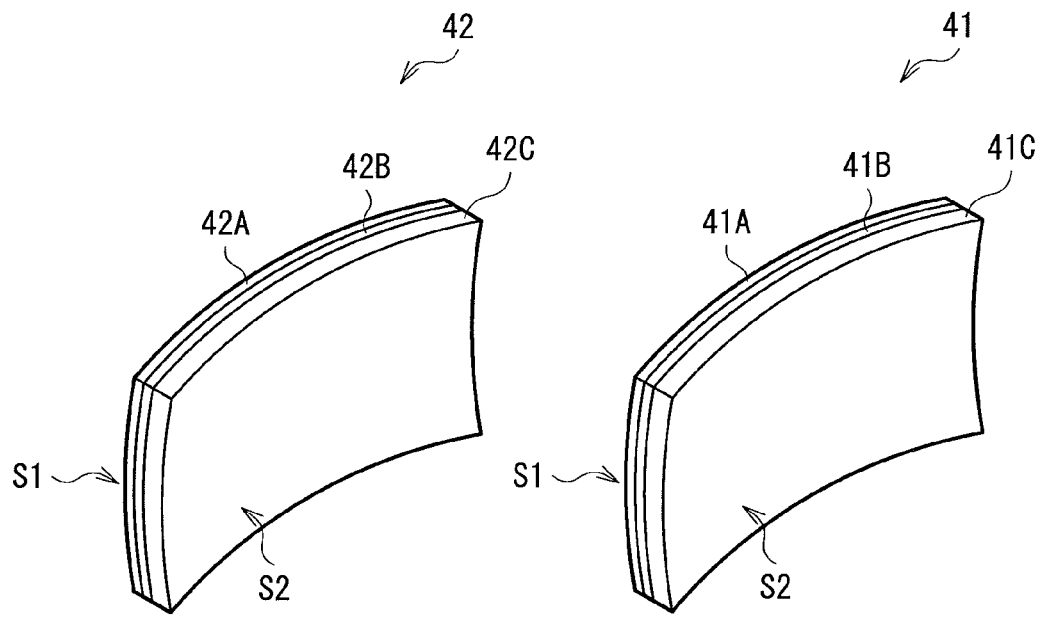
FIG. 10 is a perspective view illustrating an example of a structure of the right-eye optical device and the left-eye optical device of the polarized glasses of FIG. 1.

Next, a description will be given of the polarized glasses 2 with reference to FIG. 1 and FIG. 10. The polarized glasses 2 are set in front of eye balls of an observer (not illustrated). The polarized glasses 2 are used by the observer in observing a picture displayed on the picture display surface 1A of the display unit 1. The polarized glasses 2 are, for example, circularly-polarized glasses. For example, as illustrated in FIG. 1, the polarized glasses 2 have the right-eye optical device 41, the left-eye optical device 42, and a frame 43.

The frame 43 supports the right-eye optical device 41 and the left-eye optical device 42. The shape of the frame 43 is not particularly limited. For example, as illustrated in FIG. 1, the frame 43 may be intended to be put on a nose and ears of an observer (not illustrated). Alternately, though not illustrated, the frame 43 may be intended to be put on only the nose of the observer. Alternately, for example, though not illustrated, the frame 43 may be held with hands of the observer.

The right-eye optical device 41 and the left-eye optical device 42 are used in a state that the right-eye optical device 41 and the left-eye optical device 42 are opposed to the picture display surface 1A of the display unit 1. As illustrated in FIG. 1, the right-eye optical device 41 and the left-eye optical device 42 are preferably used in a state that the right-eye optical device 41 and the left-eye optical device 42 are arranged in one horizontal plane as much as possible, or may be used in a state that the right-eye optical device 41 and the left-eye optical device 42 are arranged in a slightly tilted flat plane.

The right-eye optical device 41 has, for example, the right-eye retarder 41A, a polarization plate 41B, and a support 41C. The right-eye retarder 41A, the polarization plate 41B, and the support 41C are arranged sequentially from the incident side of light L outputted from the picture display surface 1A of the display unit 1 (display unit 1 side). Meanwhile, the left-eye optical device 42 has, for example, the left-eye retarder 42A, a polarization plate 42B, and a support 42C. The left-eye retarder 42A, the polarization plate 42B, and the support 42C are arranged sequentially from the incident side of the light L outputted from the picture display surface 1A of the display unit 1 (display unit 1 side).

The supports 41C and 42C are able to be omitted according to needs. Further, the right-eye optical device 41 and the left-eye optical device 42 may have a member other than the foregoing exemplified members. For example, a protective film (not illustrated) for preventing a breakage piece from flying apart to an eye ball of the observer at the time of breakage of the supports 41C and 42C or a coating layer (not illustrated) for protection may be provided on the light output side of the supports 41C and 42C (observer side).

The support 41C supports the right-eye retarder 41A and the polarization plate 41B. The support 41C is made of a resin transparent to the light L outputted from the picture display surface 1A of the display unit 1 such as PC (polycarbonate). Further, the support 42C supports the left-eye retarder 42A and the polarization plate 42B. The support 42C is made of a resin transparent to the light L outputted from the picture display surface 1A of the display unit 1 such as PC (polycarbonate).

The polarization plates 41B and 42B transmit only light (polarized light) in a specific oscillation direction. For example, as illustrated in FIGS. 5A and 5B, polarization axes AX6 and AX7 of the polarization plates 41B and 42B are respectively in the direction orthogonal to the polarization axis AX3 of the polarization plate 21B of the display unit 1. For example, as illustrated in FIG. 5A, the polarization axes AX6 and AX7 are respectively in the horizontal direction in the case where the polarization axis AX3 of the polarization plate 21B is in the vertical direction. Meanwhile, for example, as illustrated in FIG. 5B, the polarization axes AX6 and AX7 are respectively in the vertical direction in the case where the polarization axis AX3 of the polarization plate 21B is in the horizontal direction. Further though not illustrated, in the case where the polarization axis AX3 of the polarization plate 21B is in the diagonally 45 deg direction, the polarization axes AX6 and AX7 are in the direction orthogonal thereto (−45 deg).

The right-eye retarder 41A and the left-eye retarder 42A are a thin layer or a film having optical anisotropy. The thickness of the phase difference film is preferably, for example, from 30 μm to 200 μm both inclusive. Further, as the phase difference film, a film having small optical anisotropy, that is, a small double reflex is preferably used. Examples of a resin film having such characteristics include COP (cycloolefin polymer) and PC (polycarbonate). Examples of COP include Zeonor and Zeonex (registered trademark of Zeon Corporation) and Arton (registered trademark of JSR Corporation).

The right-eye retarder 41A and the left-eye retarder 42A are preferably made of a material in which its photoelastic coefficient is less than the photoelastic coefficient ($80 \cdot 10^{-12}$/Pa) of PC (polycarbonate). Examples of resin material having such characteristics include modified PC (polycarbonate). The modified PC represents a substance obtained by partly changing a molecule structure (skeleton) of general PC and improving molecular structural symmetry. In addition to the modified PC, as a material having small photoelastic coefficient, PMMA (polymethyl methacrylate), PS (polystyrene), TAC (triacetyl cellulose), COP (cycloolefin polymer), COC (cycloolefin copolymer), or a blended substance thereof may be used. For blending PC and PS, the method disclosed in Japanese Unexamined Patent Application Publication No. 2001-55455 may be used. However, since the modified PC has high impact resistance and is strong to heat (glass transition temperature Tg is high), the modified PC is more preferable.

As illustrated in FIGS. 5A and 5B, the slow axis AX4 of the right-eye retarder 41A is in the direction intersecting with the polarization axis AX6 at 45 deg. Further, as illustrated in FIGS. 5A and 5B, a slow axis AX5 of the left-eye retarder 42A is in the direction intersecting with the polarization axis AX7 at 45 deg and is in the direction orthogonal to the slow axis AX4. For example, as illustrated in FIGS. 5A and 5B, in the case where the slow axes AX6 and AX7 are in the horizontal direction or the vertical direction, the slow axes AX4 and AX5 are respectively in the direction intersecting with both the horizontal direction and the vertical direction. Further, though not illustrated, in the case where the slow axes AX6 and AX7 are in the diagonally 45 deg direction, the slow axis AX4 is, for example, in the horizontal direction, and the slow axis AX5 is, for example, in the vertical direction.

Further, the slow axis AX4 is in the same direction as that of the slow axis AX1 of the right-eye phase difference region 33A, and is in the direction different from that of the slow axis AX2 of the left-eye phase difference region 33B. Meanwhile, the slow axis AX5 is in the same direction as that of the slow axis AX2, and is in the direction different from that of the slow axis AX1.

(Retardation)

Next, a description will be given of retardation of the polarized glasses 2 with reference to FIGS. 11A and 11B to FIGS. 14A and 14B. Retardation is able to be measured by several elliptic polarization analyses such as rotating analyzer method and Senarmont method. In this specification, as a retardation value, a value obtained by using rotating analyzer method is described.

FIGS. 11A and 11B and FIGS. 12A and 12B are conceptual views that exemplify how the light L1 is recognized by right and left eyes through the polarized glasses 2 while focusing attention on only the right-eye image light L1 entering the right-eye phase difference region 33A of the phase difference layer 33. Further, FIGS. 13A and 13B and FIGS. 14A and 14B are conceptual views that exemplify how light L2 is recognized by right and left eyes through the polarized glasses 2 while focusing attention on only the left-eye image light L2 entering the right-eye region 33B of the phase difference layer 33. In practice, the right-eye image light L1 and the left-eye image light L2 are outputted in a mixed state. However, in FIGS. 11A and 11B to FIGS. 14A and 14B, as a matter of convenience, the right-eye image light L1 and the left-eye image light L2 are separately described.

In the case where the picture display surface of the display unit 1 is observed by using the polarized glasses 2, for example, as illustrated in FIGS. 11A and 11B and FIGS. 12A and 12B, it is necessary that a right eye is able to recognize an image of a right-eye pixel, and a left eye is not able to recognize the image of the right-eye pixel. Concurrently, for example, as illustrated in FIGS. 13A and 13B and FIGS. 14A and 14B, it is necessary that the left eye is able to recognize an image of a left-eye pixel, and the right eye is not able to recognize the image of the left-eye pixel. To this end, it is preferable to set retardation of the right-eye phase difference region 33A and the right-eye retarder 41A and retardation of the left-eye phase difference region 33B and the left-eye retarder 42A as described below.

Specifically, it is preferable that one of the retardation of the right-eye retarder 41A and the retardation of the left-eye retarder 42A be $+\lambda/4$ ($\lambda$ is wavelength), and the other be $-\lambda/4$. The fact that each retardation sign is opposite means that each direction of each slow axis is different by 90 deg. At this time, it is preferable that the retardation of the right-eye phase difference region 33A be identical with the retardation of the right-eye retarder 41A, and it is preferable that the retardation of the left-eye phase difference region 33B be identical with the retardation of the left-eye retarder 42A.

In practice, it is not easy to select a material with which retardation of the right-eye retarder 41A and the left-eye retarder 42A in all wavelengths (entire visible region) is able to be $\lambda/4$. However, compared to a state that the retardation of the right-eye retarder 41A and the left-eye retarder 42A in all wavelengths is $\lambda/4$, it is more important that the retardation of the right-eye phase difference region 33A is identical with (close to) the retardation of the right-eye retarder 41A in all wavelengths and the retardation of the left-eye phase difference region 33B is identical with (close to) the retardation of the left-eye retarder 42A in all wavelengths. Meanwhile, though it is not necessary that the retardation in all wavelengths is $\lambda/4$, it is preferable that retardation be $\lambda/4$ in the green region range about from 500 nm to 560 nm both inclusive in order to view 3D image having high luminance and appropriate color for the following reason. That is, human retina has high sensitivity to green wavelength band light, and adjustment in the green region is relatively suitable for blue and red regions.

1.3 Basic Operation

Next, a description will be given of an example of a basic operation in displaying an image in the display unit 1 of this embodiment with reference to FIGS. 11A and 11B to FIGS. 14A and 14B.

First, in a state that light irradiated from the backlight 10 enters the liquid crystal display panel 20, a parallax signal including a right-eye image and a left-eye image as a video signal is inputted to the liquid crystal display panel 20. The right-eye image light L1 is outputted from pixels in an odd number row (FIGS. 11A and 11B or FIGS. 12A and 12B), and the left-eye image light L2 is outputted from pixels in an even number row (FIGS. 13A and 13B or FIGS. 14A and 14B).

After that, the right-eye image light L1 and the left-eye image light L2 are converted into oval polarized light by the right-eye phase difference region 33A and the left-eye phase difference region 33B of the phase difference element 30, and are subsequently outputted outside from the picture display surface 1A of the display unit 1. After that, the light outputted outside of the display unit 1 enters the polarized glasses 2. The oval polarized light is returned to linear polarized light by the right-eye retarder 41A and the left-eye retarder 42A. After that, the light enters the polarization plates 41B and 42B.

At this time, a polarization axis of light corresponding to the right-eye image light L1 of light entering the polarization plates 41B and 42B is in parallel with the polarization axis AX6 of the polarization plate 41B, and is orthogonal to the polarization axis AX7 of the polarization plate 42B. Thus, the light corresponding to the right-eye image light L1 of light entering the polarization plates 41B and 42B is transmitted through only the polarization plate 41B, and reaches the right eye of an observer (FIGS. 11A and 11B or FIGS. 12A and 12B).

Meanwhile, a polarization axis of light corresponding to the left-eye image light L2 of light entering the polarization plates 41B and 42B is orthogonal to the polarization axis AX6 of the polarization plate 41B, and is in parallel with the polarization axis AX7 of the polarization plate 42B. Thus, the light corresponding to the left-eye image light L2 out of light entering the polarization plates 41B and 42B is transmitted through only the polarization plate 42B, and reaches the left eye of the observer (FIGS. 13A and 13B or FIGS. 14A and 14B).

As described above, the light corresponding to the right-eye image light L1 reaches the right eye of the observer, and the light corresponding to the left-eye image light L2 reaches the left eye of the observer. In the result, the observer is able to recognize a displayed image as if a stereoscopic image is displayed on the picture display surface 1A of the display unit 1.

1.4 Effect

Next, a description will be given of effects of the display unit 1 of this embodiment. In this embodiment, in the case where the retardation of the anti-glare film 34 is 20 nm or less and the total haze of the anti-glare film 34 is 30% or less, both crosstalk of the left-eye image light and crosstalk of the right-eye image light are able to be kept 3.5% or less. Thus, in this case, deterioration of 3D characteristics is able to be decreased.

Further, in this embodiment, in the case where the retardation of the anti-glare film 34 is 10 nm or less and the total haze of the anti-glare film 34 is 30% or less, both crosstalk of the left-eye image light and crosstalk of the right-eye image light are able to be kept 2.5% or less. Thus, in this case, deterioration of 3D characteristics is able to be significantly decreased.

2. Modification

In the foregoing embodiment, the case that the phase difference regions (the right-eye phase difference region 33A and the left-eye phase difference region 33B) of the phase difference element 30 extend in the horizontal direction has been exemplified. However, the phase difference regions (the right-eye phase difference region 33A and the left-eye phase difference region 33B) of the phase difference element 30 may extend in other direction. For example, though not illustrated, the phase difference regions (the right-eye phase difference region 33A and the left-eye phase difference region 33B) of the phase difference element 30 may extend in the vertical direction.

Further, in the foregoing embodiment and the foregoing modification, the case in which the phase difference regions (the right-eye phase difference region 33A and the left-eye phase difference region 33B) of the phase difference element 30 wholly extend in the horizontal direction or in the vertical direction of the phase difference element 30 has been exemplified. However, though not illustrated, the phase difference regions (the right-eye phase difference region 33A and the left-eye phase difference region 33B) of the phase difference element 30 may be arranged two dimensionally both in the horizontal direction and in the vertical direction.

The description has been hereinbefore given of the case that the polarized glasses 2 are circular polarized glasses and the display unit 1 is a display unit for circular polarized glasses. However, the present disclosure is applicable to a case that the polarized glasses 2 are linear polarized glasses and the display unit 1 is a display unit for linear polarized glasses.

In this specification, "uniform," "parallel," "orthogonal," "vertical," and "the same direction" respectively include "approximately uniform," "approximately parallel," "approximately orthogonal," "approximately vertical," and "approximately the same direction" as long as effects of the present disclosure are not impaired. For example, an error resulting from various causes such as a manufacturing error and variation may be included.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A phase difference element comprising:
    an anti-glare film;
    an alignment film; and
    a phase difference film provided between the anti-glare film and the alignment film,
    wherein the phase difference film has a phase difference layer composed of two or more phase difference regions each having different direction of a slow axis that are regularly arranged in a plane,
    wherein retardation of the anti-glare film is 20 nm or less and total haze of the anti-glare film is 30% or less,
    wherein crosstalk of light transmitted through a first one the phase difference regions and crosstalk of light transmitted through a second one of the phase difference regions is 3.5% or less,
    wherein the alignment film includes two or more alignment regions, each region having different alignment directions, and
    wherein a first alignment region includes grooves extending in a first direction, and a second alignment region includes grooves extending in a second direction that is orthogonal to the first direction.

2. The phase difference element according to claim 1, wherein the retardation of the anti-glare film is 10 nm or less and the total haze of the anti-glare film is 30% or less.

3. The phase difference element according to claim 2, wherein the crosstalk of light transmitted through a first one the phase difference regions and the crosstalk of light transmitted through a second one of the phase difference regions is 2.5% or less.

4. A display unit comprising:
 a display panel in which a plurality of pixels are arranged in a matrix state; and
 a phase difference element attached to the display panel,
 wherein the phase difference element includes an anti-glare film, an alignment film, and a phase difference film provided between the anti-glare film and the alignment film and arranged on the display panel side, the anti-glare film being arranged on the side opposite to the display panel with respect to the phase difference film,
 the phase difference film has a phase difference layer composed of two or more phase difference regions each having different direction of a slow axis that are regularly arranged in a plane,
 wherein retardation of the anti-glare film is 20 nm or less and total haze of the anti-glare film is 30% or less,
 wherein crosstalk of light transmitted through a first one the phase difference regions and crosstalk of light transmitted through a second one of the phase difference regions is 3.5% or less,
 wherein the alignment film includes two or more alignment regions, each region having different alignment directions, and
 wherein a first alignment region includes grooves extending in a first direction, and a second alignment region includes grooves extending in a second direction that is orthogonal to the first direction.

5. The display unit according to claim 4, wherein the retardation of the anti-glare film is 10 nm or less and the total haze of the anti-glare film is 30% or less.

6. The display unit according to claim 5, wherein the crosstalk of light transmitted through a first one the phase difference regions and the crosstalk of light transmitted through a second one of the phase difference regions is 2.5% or less.

* * * * *